(12) United States Patent
Sacco

(10) Patent No.: US 6,763,349 B1
(45) Date of Patent: Jul. 13, 2004

(54) DYNAMIC TAXONOMY PROCESS FOR BROWSING AND RETRIEVING INFORMATION IN LARGE HETEROGENEOUS DATA BASES

(76) Inventor: Giovanni Sacco, Via Duchessa Jolanda 21, I-10138 Turin (IT)

( * ) Notice: Subject to any disclaimer, the term of this patent is extended or adjusted under 35 U.S.C. 154(b) by 0 days.

(21) Appl. No.: 09/868,339

(22) PCT Filed: Dec. 3, 1999

(86) PCT No.: PCT/IT99/00401
§ 371 (c)(1),
(2), (4) Date: Jun. 18, 2001

(87) PCT Pub. No.: WO00/36529
PCT Pub. Date: Jun. 22, 2000

(30) Foreign Application Priority Data

Dec. 16, 1998 (IT) ......................................... TO98A1049

(51) Int. Cl.[7] .............................................. G06F 17/30
(52) U.S. Cl. .................................... 707/3; 707/2; 707/7
(58) Field of Search ............................... 707/1, 2, 3, 4, 707/5, 6, 7

(56) References Cited

U.S. PATENT DOCUMENTS 5,644,740 A     7/1997   Kiuchi ........................ 345/853

FOREIGN PATENT DOCUMENTS

EP            0 694 829          1/1996

OTHER PUBLICATIONS

M. A. Hearst, et al., Annual International ACM–SIGIR Conference on Research and Development in Information Retrieval, pp. 246–255, "CAT–A–CONE: An Interactive Interface for Specifying Searched and Viewing Retrieval Results Using a Large Category Hierarchy", 1997.

G. Schmeltz Pedersen, Proceedings of the Annual International ACM SIGIR Conference on Research and Development in Information Retrieval, vol. 16, pp. 270–279, "A Browser for Bibliographic Information Retrieval, Based on an Application of Lattice Theory", 1993.

G. A. Story, et al., Computer, US, IEEE Computer Society, vol. 25, No. 9, pp. 17–25, "The Rightpages Image–Based Electronic Library for Alerting and Browsing", Sep. 1, 1992.

*Primary Examiner*—Shahid Alam
*Assistant Examiner*—Isaac Woo
(74) *Attorney, Agent, or Firm*—Oblon, Spivak, McClelland, Maier & Neustadt, P.C.

(57) ABSTRACT

A process is disclosed for retrieving information in large heterogeneous data bases, wherein information retrieval through visual querying/browsing is supported by dynamic taxonomies; the process comprises the steps of: initially showing a complete taxonomy for the retrieval; refining the retrieval through a selection of subsets of interest, where the refining is performed by selecting concepts in the taxonomy and combining them through Boolean operations; showing a reduced taxonomy for the selected set; and further refining the retrieval through an iterative execution of the refining and showing steps.

12 Claims, 1 Drawing Sheet

DYNAMIC TAXONOMY PROCESS FOR BROWSING AND RETRIEVING INFORMATION IN LARGE HETEROGENEOUS DATA BASES

BACKGROUND OF THE INVENTION

The present invention refers to a dynamic taxonomy process for browsing and retrieving information in large heterogeneous data bases.

Information retrieval on this type of data bases (for example those available on the Internet) is nowadays a slow task, sometimes impossible to realize due to the enormous amount of data to be analyzed, and that can be implemented with difficulty with the currently available tools. The following documents deal with the prior art in this field: Hearst M. et al: "Cat-a-cone: an interactive interface for specifying searched and viewing retrieval results using a large category hierarchy," Annual International ACM-SIGIR Conference on Research and Development in Information Retrieval, US, New York, N.Y.: ACM, 1997, pages 246–255; EP-A-0 694 829 (XEROX Corp.); U.S. Pat. No. 5,644,740 (Kiuchi Itsuko); Gert Schmeltz Pedersen: "A browser for bibliographic information retrieval, based on an application of lattice theory," Proceedings of the Annual International ACM SIGIR Conference on Research and Development in Information Retrieval, US, New York, ACM, vol. CONF., 16, 1993, pages 270–279; and Story G. et al: "The Rightpages image-based electronic library for alerting and browsing," Computer, US, IEEE Computer Society, Long Beach, Calif., US, vol. 25, no. 9, 1 Sep. 1992, pages 17–25.

Dynamic taxonomies are a model to conceptually describe and access large heterogeneous information bases composed of texts, data, images and other multimedia documents.

The following documents deal with prior art in this field: Hearst M. et al: 'Cat-a-cone: an interactive interface for specifying searched and viewing retrieval results using a large category hierarchy', Annual International ACM-SIGIR Conference on Research and Development in Information Retrieval, US, New York, N.Y.: ACM, 1997, pages 246–255; EP-A-0 694 829 (XEROX Corp.); U.S. Pat. No. 5,644,740 (Kiuchi Itsuko); Gert Schmeltz Pedersen: 'A browser for bibliographic information retrieval, based on an application of lattice theory', Proceedings of the Annual International ACM SIGIR Conference on Research and Development in Information Retrieval, US, New York, ACM, vol. CONF., 16, 1993, pages 270–279; and Story G. et al: 'The Rightpages image-based electronic library for alerting and browsing", Computer, US, IEEE Computer Society, Long Beach, Calif., US, vol. 25, no. 9, 1 Sep. 1992, pages 17–25.

As disclosed in Hearst, a dynamic taxonomy is basically a IS-A hierarchy of concepts, going from the most general (topmost) to the most specific. A concept may have several fathers. This is a conceptual schema of the information base, i.e. the "intension". Documents can be freely classified under different concepts at different level of abstraction (this is the "extension"). A specific document is generally classified under several concepts.

Dynamic taxonomies enforce the IS-A relationship by containment, i.e. the documents classified under a concept C are the deep extension of C, i.e. the recursive union of all the documents classified under C and under each descendant C' of C.

In a dynamic taxonomy, concepts can be composed through classical boolean operations. In addition, any set S of documents in the universe of discourse U (defined as the set of all documents classified in the taxonomy) can be represented by a reduced taxonomy. S may be synthesized either by boolean expressions on concepts or by any other retrieval method (e.g. "information retrieval"). The reduced taxonomy is derived from the original taxonomy by pruning the concepts (nodes) under which no document d in S is classified.

A new visual query/browsing approach is supported by dynamic taxonomies. The user is initially presented with the complete taxonomy. He/she can then refine the result by selecting a subset of interest. Refinement is done by selecting concepts in the taxonomy and combining them through boolean operations. She/he will then be presented with a reduced taxonomy for the selected set of documents, which can be iteratively further refined.

The invention described here covers the following aspects of dynamic taxonomies:

1. additional operations;
2. abstract storage structures and operations on such structures for the intension and the extension;
3. physical storage structures, architecture and implementation of operations;
4. definition, use and implementation of virtual concepts;
5. definition, use and implementation of time-varying concepts;
6. binding a dynamic taxonomy to a database system;
7. using dynamic taxonomies to represent user profiles of interest and implementation of user alert for new interesting documents based on such profiles of interest.

The above and other objects and advantages of the invention, as will appear from the following description, are obtained by a dynamic taxonomy process as claimed in claim 1. Preferred embodiments and non-trivial variations of the present invention are claimed in the dependent Claim.

BRIEF DESCRIPTION OF THE DRAWINGS

The present invention will be better described by some preferred embodiments thereof, given as a non-limiting example, with reference to the enclosed drawing, whose

DESCRIPTION OF THE PREFERRED EMBODIMENTS

Figure 1:
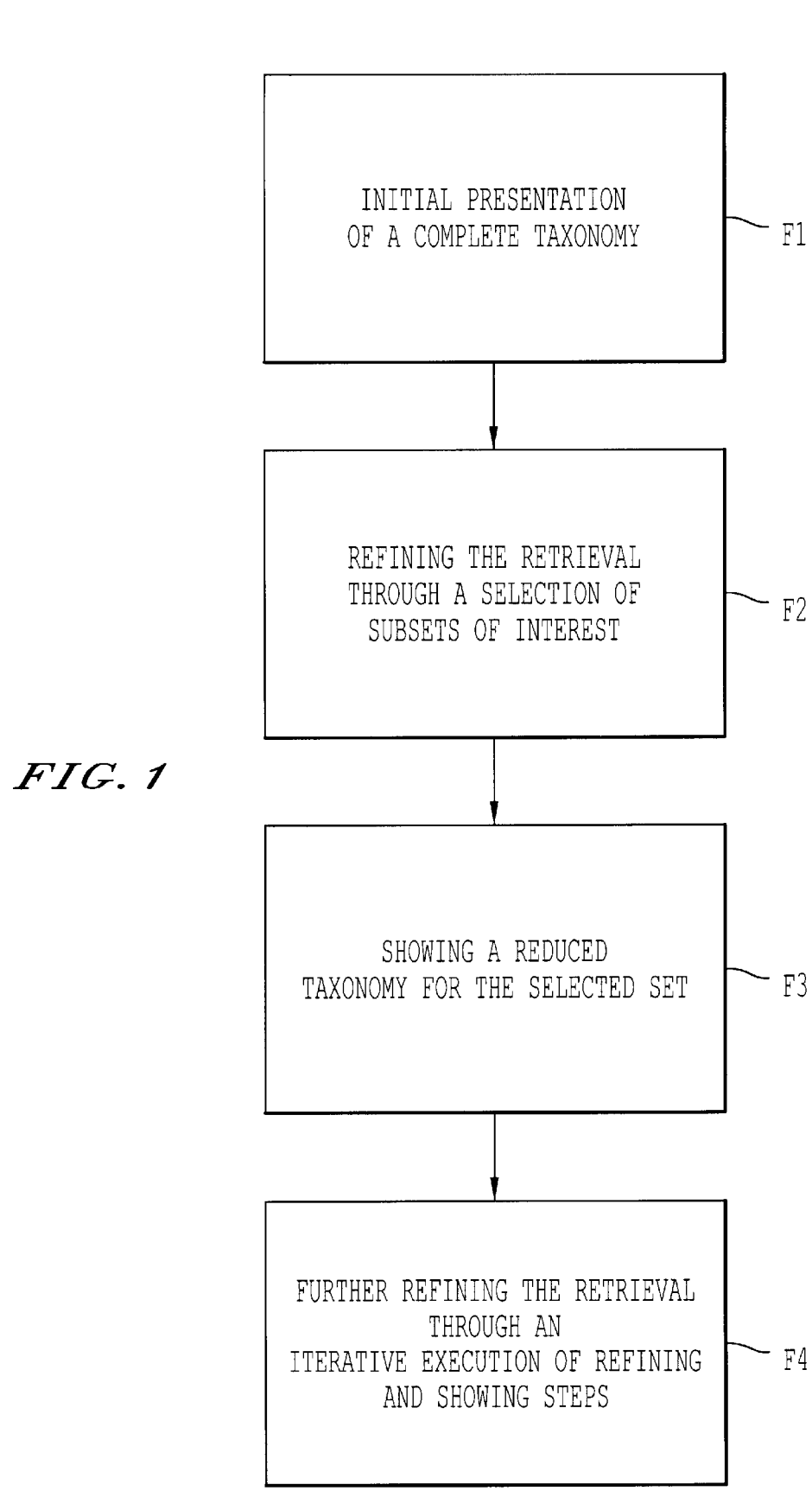
FIG. 1 shows a block diagram of the process of the present invention.

Before proceeding with a detailed description of the invention, suitable terminology remarks will be made. The set of documents classified under the taxonomy (corpus) is denoted by U, the universe of discourse. Each document d in U is uniquely identified by an abstract label called document ID of d (DID(d)). Each concept c in the taxonomy is uniquely identified by an abstract label called concept ID of c (CID(c)). Concepts are partitioned into terminal concepts (concepts with no concept son in the taxonomy) and non-terminal concepts. T denotes the set of concepts used in the taxonomy.

The taxonomy is usually a tree, but lattices (deriving from a concept having more than one father) are allowed. Documents can be classified under any (terminal or non-terminal) concept in the taxonomy. A specific document d in U may be classified under one or more concepts. The single, most general concept in the taxonomy is called the root of the taxonomy. This concept need not be usually stored in the extension, since it represents the entire corpus.

The term "deep extension" of a concept c denotes all the documents classified under c or under any descendant of c. The term "shallow extension" of a concept c denotes all the documents directly classified under c.

If c is a concept, $C^{up}(c)$ denotes the set {c union {c': c' is an ancestor of c in the taxonomy, and c' is not the root of the taxonomy}}. $C^{up}(c)$ is computed by the recursive application of operation AIO3 (described hereinbelow). If c is a concept, $C^{down}(c)$ denotes the set {c union {c': c' is a descendant of c in the taxonomy}}. $C^{down}(c)$ is computed by the recursive application of operation AIO2 (described hereinbelow).

With reference to FIG. 1, a block diagram is shown of the main steps of the process of the present invention, from which all further developments of the process itself originate, such developments being described hereinbelow.

According to the diagram in FIG. 1, the process for retrieving information on large heterogeneous data bases of the present invention comprises the steps of:

(F1) initially showing a complete taxonomy for retrieval;

(F2) refining the retrieval through a selection of subsets of interest, where the refining step is performed by selecting concepts in the taxonomy and combining them through boolean operations;

(F3) showing a reduced taxonomy for the selected set; and (F4) further refining the retrieval through an iterative execution of the refining and showing steps.

In addition to the previously-described operations, the following operations can be supported:

a. projection under a given CID of a set S of DIDs:
   it extracts all the children c of CID such as there is at least a document in S in the deep extension of c b. extracting the CID's for a specific document d in U.

The prior art has never specified storage structures nor the implementation of operations, that are both presented in this context. Abstract storage structures are defined with the following notation. Given domains A1, ..., AN and B1, ..., BM:

the relation R: [A1, ..., AN]→[B1, ..., BM] means that a N-uple of values drawn from domains A1, ..., AN uniquely identifies an M-uple of values drawn from domains B1, ..., BM. If [A1, ..., AN]→[B1, ..., BM] holds, then any [A1, ..., AN]→[Bi] holds, where Bi is drawn from any domain in the set {B1, ..., BM} the relation R: [A1, ..., AN]→{B1, ..., BM} means that a N-uple of values drawn from domains A1, ..., AN uniquely identifies a set of M-uples of values drawn from domains B1, ..., BM. If [A1, ..., AN]→{B1, ..., BM} holds, then any [A1, ..., AN]→{Bi} holds, where Bi is drawn from any domain in the set {B1, ..., BM}.

When brackets are omitted in the right part, square brackets are assumed.

Abstract relations can be trivially mapped (for the purpose of illustration, and with no intent to restrict their representation) to relations in a relational schema, in the following way:

R: R: [A1, ..., AN]→[B1, ..., BM] maps into R(<u>A1, ..., AN</u>, B1, ..., BM)

R: R: [A1, ..., AN]→{B1, ..., BM} maps into a set of $4^{th}$ NF relations Ri(<u>A1, ..., AN, Bi</u>)

where underlined domains are key attributes of R. Abstract SQL queries on these relations will be used to express operations. When expedient, the notation A.B applied to an abstract relation [A]→[B] or [A]→{B} will be used to denote the value or the set of values of B corresponding to a given value of A. Domain CID holds the abstract labels of concepts, i.e. stands for the set of values {CID(c), for all c in the taxonomy}. Domain DID holds the abstract labels of documents, i.e. denotes the set of values {DID(d), for all d in U}.

Abstract structures to store the intension will now be described.

The intension is the taxonomy itself; it can be seen as a conceptual schema for a set of corpora. The intension is stored as:

AIS1. One or more "dictionary" relations in the form

Di: [CID]→[textualLabel]

storing the user-visible definition of each concept; the domain "textualLabel" holds natural language descriptions of concepts. Each dictionary can be in a different "language", thereby allowing multilingual corpora and/or different descriptions of concepts.

AIS2. A language directory, identifying the appropriate dictionary relation for a specific "language" (required only if more than one "language" for concept description is used) in the form:

LD: [LANGUAGE_ID]→D where LANGUAGE_ID holds the abstract identification of languages and D holds the existing dictionaries.

An alternate representation of AIS1, AIS2 is by a single relation

AIS1': [CID, LANGUAGE_ID]→textualLabel.

AIS3. A father to son relation in the form

FS: [CID]→{SON_CID} or

FS': [CID, SEQ]→[SON_CID]

storing, for each concept c, its sons in the taxonomy. The domain SON_CID is the same as CID. The domain of SEQ is the set of natural numbers.

The second form, which is generally used, allows to supply a meaningful display order among the sons of a concept c.

AIS4. A son to father relation, in the form

SF: [CID]→{FATHER_CID} storing, for each concept c, its fathers in the taxonomy. The domain FATHER_CID is the same as CID. If the taxonomy is not a lattice (i.e. any concept c can have no more than one father), this relation becomes:

SF: [CID]→[FATHER_CID].

In this latter case, information on the father of a specific concept c may alternatively be stored in the dictionaries as:

Di: [CID]→FATHER_CID, textualLabel although this results in redundancy if more than one dictionary is maintained.

Abstract storage structures for the extension will now be described.

The extension represents the classification of documents. As such, it depends on the specific corpus. The extension is abstractly represented by the following three relations:

AES1. Deep extension, in the form

DE: [CID]→{DID} storing, for each concept c, all the documents in its deep extension (that is, all the documents classified under c or under any descendant c' of c).

AES2. Shallow extension, in the form

SE: [CID]→{DID} equivalent to [<u>CID, DID</u>]

storing, for each concept c, all the documents in its shallow extension (that is, all the documents directly classified under c). The shallow extension and the deep extension are the same for terminal concepts, so that for such terminal concepts only one of DE and SE needs to be kept (typically, DE will be kept).

AES3. Classification, in the form

CL: [DID]→{CID} storing, for each document, the most specific concepts under which it is classified. All the ancestors of these concepts can be easily recovered through the son-to-father (SF) relation in the intension. This structure is required only if the display of the classification for stored documents is supported at the user level. This storage structure is optional, since the set K of concepts under which a specific DID is stored can be synthesized by operation AE05 applied to each concept c in T on the singleton set {DID}. A concept c is then in K if and only if operation AE05 returns TRUE.

AES4. Document directory

Not specified, since it depends on the host system. It maps a document id into information required to retrieve the specific document (for example, the file name).

The abstract implementation of operations on the intension will now be described.

AIO1. Given a concept c identified by K=CID(c), find its label in a specific language L.
1. Access the appropriate language directory
   SELECT D
   FROM LD
   WHERE LANGUAGE_ID=L
2. Use K as a key to access the textual label
   SELECT textualLabel
   FROM D
   WHERE CID=K AIO2. Given K=CID(c) find all its sons.
Access the father-to-son relation FS, using K as a partial key
   SELECT SON_CID
   FROM FS
   WHERE CID=K
Or
Access the father-to-son relation FS', using K as a partial key
   SELECT SEQ, SON_CID
   FROM FS'
   WHERE CID=K
   ORDER BY SEQ, SON_CID AIO3. Given a K=CID(c), find all its fathers.
Access the son-to-father relation SF, using K as a partial key
   SELECT FATHER_CID
   FROM SF
   WHERE CID=K AIO4. Insert, delete, change operations.
Insert operations are performed by inserting the new concept C:
   in the dictionaries (AIS1)
   in the father to son relation (AIS3)
   in the son to father relation (AIS4)

If C is a son of another concept C', it may be useful to allow the user to reclassify under C some of the documents presently classified in the shallow extension of C'.

In the case in which each concept has a single father in the taxonomy, the deletion of a concept C is performed by deleting from the intension (AIS1, AIS3, AIS4) all concepts $c \in C^{down}(C)$. In addition (in order to avoid losing documents), the documents in the deep extension of C should be added to the shallow extension of C', where C' is the father of C in the taxonomy, unless C' is the root of the taxonomy. The shallow (AES2) and deep (AES1) extensions for all concepts $c \in C^{down}(C)$ must be removed. The concepts in $C^{down}(C)$ must be removed from the classification (AES3) of all the documents in the deep extension of C.

Alternatively, and in the general case in which concepts can have multiple fathers, we proceed as follows.

Define LinkDelete(f, s) as:
1. remove from AIS3 the instance where CID=CID(f) and SON_CID=CID(s)
2. remove from AIS4 the instance where CID=CID(s) and FATHER_CID=CID(f)

Define BasicDelete(c) as:
1. for each f in {f: f is a father of c} call LinkDelete(f, c)
2. remove the deep (AES1) and shallow (AES2) extension for c, its classification (AES3), and any dictionary entries associated with c.

Define RecursiveDelete(f, s) as:
1. if f is the only father of s then
   1.1. for each s' in {s': s' is a son of s} call RecursiveDelete(s, s')
   1.2. call BasicDelete(s)
2. else call LinkDelete(f, s)

Define RecomputeDeepExtension(c) as:
1. for each s in {s: s is a son of c}
   1.1. set the deep extension of c:
        DeepExtension(c)=DeepExtension(c) union RecomputeDeepExtension(s)
2. return(DeepExtension(c))

Define UpdateDeepExtension(c) as:
1. for each f in {f: f is a father of c}
   1.1. DeepExtension(f)=DeepExtension(c) union ShallowExtension(f)
   1.2. UpdateDeepExtension(f)

Deletion of c is then implemented as:
1. Compute the set F(C), which represents all the fathers of the concept to be deleted (accessible through relation AIS4). All and only the concepts in F(C) and their ancestors will have their deep extension affected by the deletion of C.
2. For each s in {s: s is a son of C}, call RecursiveDelete(C, s)
3. Call BasicDelete(C).
4. Recompute the deep extension of all the fathers of C: for each f in F(C) call RecomputeDeepExtension(f)
5. Update the deep extension of all the ancestors of the set F(C):
   5.1. For each f in F(C) call UpdateDeepExtension(f)

Changes in the taxonomy may be of three types:
1. changing the labeling of a concept C: this only requires the modification of the textualLabel in AIS1
2. changing the place of a concept C in the taxonomy
3. adding an additional father C' to C in the taxonomy In case 2, let C' be the current father of C and C" the new father of C. First, C must be deleted from the taxonomy, and reinserted with C" as a father. The deep extension of C must be deleted from the deep extension of all concepts $c \in C^{up}(C')$ (by set subtraction, or by applying the above algorithm for deletion with steps 2 and 3 replaced by C reparenting). The deep extension of C must be added to the deep extension of all concepts $c \in C^{up}(C'')$ (by set union). No changes in shallow extensions are required.

In case 3, the deep extension of C must be added to the deep extension of all concepts $c \in C^{up}(C')$ (by set union).

The abstract implementation of operations on the extension will now be described.

AEO1. Given a concept c such that CID(c)=K, find its deep extension.

Access the deep-extension relation DE, using K as a partial key

SELECT DID
FROM DE
WHERE CID=K

AEO2. Given a concept c such that CID(c)=K, find its shallow extension.

Access the shallow extension relation SE, using K as a partial key

SELECT DID
FROM SE
WHERE CID=K

AEO3. Test the membership of a set of DIDs {DID} in the deep extension of a concept CID.
  1. Retrieve the deep extension of CID
  2. For each d in {DID}, test whether d belongs to the deep-extension; if it does, return TRUE; if no d in {DID} does, return FALSE AEO4. Given a set of DIDs {DID}, count the number of documents in {DID} which are also in the deep extension of CID.
  1. Retrieve the deep extension of CID
  2. Initialize CNT to 0
  3. For each d in {DID}, test whether d belongs to the deep-extension; if it does, CNT=CNT+1
  4. Return CNT AEO5. Test the membership of a set of DIDs {DID} in the shallow extension of a concept CID.

As in AEO3, by substituting the deep extension with the shallow extension.

AEO6. Given a set of DIDs {DID}, produce the projection under a concept CID.
  1. Retrieve the set {SON} of all the sons of CID
  2. Initialize set R to empty
  3. For each concept s in SON, use operation AEO3, or operation AEO4 if counters are desired, to test the membership of {DID} in s. If the operation returns TRUE (>0 if AEO4 is used) add s to list R
  4. Return R AEO7. Given a set of DIDs {DID}, produce the reduced taxonomy for {DID}.

As a clarification, the set of DIDs for which the reduced taxonomy has to be produced can be generated by operations on the taxonomy and also by any other means, including, without loss of generality, database queries and information retrieval queries. Also, the current combination of concepts can be used as a pre-filter for other retrieval methods.

For performance reason, the reduced taxonomy is usually produced on demand: the request only displays the highest levels in the tree. The set {DID} is kept in memory, so that when the explosion of a specific concept in the reduced taxonomy is requested, appropriate filtering is performed.
  1. Produce the projection of {DID} for the root On the subsequent explosion of concept c:
     Produce the projection of {DID} for c The reduced tree can also be totally computed in a single step. Let RT be the set of concepts in the reduced tree. RT can be computed by testing, for each concept c in T, the membership of {DID} in c through operation AEO3 or AEO4 (if counters are required). Concept c is in RT if and only if operation AEO3 returns TRUE or operation AEO4 returns a counter larger than 0.

The computation can be speeded up in the following way:
  1. Initialize a table S of size |T|, where S[i] holds information on the current status of concept i, initialized at "pending".
  2. Starting from the uppermost levels, and continuing down in the tree, process concept i.
     2.1. If S[i] is "empty", i does not belong to RT, and processing can continue with the next concept.
     2.2. If S[i] is not "empty", apply operation AEO3 or AEO4 to i.
        2.2.1. If the operation returns TRUE (AEO3) or a counter larger than 0 (AEO4), i belongs to RT.
        2.2.2. Otherwise, neither i nor any of its descendants belong to RT: set to "empty" all S[j] in S, such that j is a descendant of i in the taxonomy. Descendants can be efficiently obtained by keeping a precomputed table D, holding for each concept in the taxonomy a list of all the concepts descending from it in the taxonomy (such a table must be recomputed every time the taxonomy changes).

AEO8. Boolean combination of concepts.

Boolean combinations of concepts are performed through the corresponding set operations on the deep extension of concepts. Let c and c' be two concepts, and DE(c) and DE(c') their deep extension (represented by AES1):

c AND c' corresponds to DE(C)∩DE(c')

c OR c' corresponds to DE(c)∪DE(c')

c MINUS c' corresponds to DE(c)−DE(c')

NOT c corresponds to U−DE(c), where U is the universe

AEO9. Insertion of a new document.

The insertion of a new document d (represented by DID(d)) classified under a set of concepts {C} requires the following steps:

for each c∈{C}
  1. insert DID(d) in the shallow extension of c (AES2), if c is not a terminal concept and the shallow extension must be stored
  2. insert DID(d) in the deep extension (AES1) of $C^{up}(c)$.
  3. insert an item [DID(d)]→{C} in the classification structure AES3

AEO10. Deletion of an existing document.

The deletion of a document d (represented by DID(d)) requires the following steps:
  1. retrieve the set of concepts {C} under which d is shallowly classified, by accessing AES3 with DID(d) as the key (operation AEO2)
  2. for each c∈{C}
     a. delete DID(d) from the shallow extension of c
     b. for all $c' \in C^{up}(c)$: delete DID(d) from the deep extension of c'
  3. delete the entry corresponding to DID(d) from AES3.

If AES3 is not stored, deletion is performed in the following way. For each concept c in T, if d belongs to the shallow extension of c:
  1. delete DID(d) from the shallow extension of c
  2. for all $c' \in C^{up}(c)$: delete DID(d) from the deep extension of c'

AEO11. Document reclassification.

Changes in the classification of a document d (represented by DID(d)) are implemented in the following way. Let d be initially classified under a concept c (possibly null) and let the new concept under which d must be classified be c' (possibly null). If both c and c' are non-null, the operation means that d was previously classified under c and must now be classified under c'; if c is null, the operation means that d is additionally classified under c'; if c' is null, the operation means that the original classification under c must be removed. At least one of c and c' must be non-null.
If c is not null:
1. eliminate DID(d) from the shallow extension (AES2) of c
2. eliminate DID(d) from the deep extension (AES1) of all $c'' \in C^{uP}(c)$
3. eliminate c from the classification of d (AES3)
If c' is not null:
1. insert DID(d) in the shallow extension (AES2) of c' (if the shallow extension of c exists)
2. insert DID(d) in the deep extension (AES1) of all $c'' \in C^{uP}(c')$
3. insert c' in the classification of d (AES3)

AEO12. Find the concepts under which a document d is immediately classified.
Retrieve {C} from AES3, using DID(d) as a key.

Physical storage structures, architecture and implementation of operations will now be described.

As regards the intension, storage structures usually contribute with a negligible overhead to the overall storage cost, since a few thousand of concepts are usually adequate even for semantically rich corpora. Storage for these structures may be provided by any database management system or any keyed access method. The second form of AIS3 (FS') requires an ordered access, since SEQ is used to order the sons of a specific concept. Because of the low overhead, all the intensional storage structures (with the possible exception of AIS1, the dictionaries) may be usually kept in central memory.

As regards the extension, the most critical component is AES1 (the deep extension), for several reasons. First, deep-extension semantics are the natural semantics for boolean combinations of concepts (see AEO8). Second, the production of reduced taxonomies requires a possibly large number of projections (which are performed on the deep extension), whose performance is critical for visual operations.

It is critical that the deep extension of concept c is explicitly stored, and not computed as the union of the shallow extensions of all the descendants of c.

Although any dbms or keyed access method can be used to provide storage for the deep extension, the set of documents in the deep extension can be more efficiently represented than by straightforwardly mapping the abstract relation.

The use of fixed size bit vectors in the present context will now be described. Information data bases with a small-to-moderate number of documents can effectively represent the deep extension of a concept c by bit vectors, each of size equal to $|U'|$, the maximum number of documents in the universe. In the bit vector, bit i is set if and only if the document d with DID(d)=i is in the deep extension of c.

Set operations on the deep extension only involve logical operations on bit vectors (AND, OR, NOT, etc.). These operations take one or more bit vectors and produce a result bit vector of the same size.

Let document id's be numbered 0 to $|U'|-1$, and n be the number of bits in the word of the host CPU. For performance reasons, it is better to set the fixed size of bit vectors at $\lceil |U'|/n \rceil$, in order to be able to perform bit operations at the word level. Unused bit positions are left unset.

Counting the number of documents in the result of any operation can be efficiently performed by table lookup, in the following way.

Let the unit of access UA (not necessarily the CPU word) be n bits. Build once a vector V of $2^n$ elements, stored in memory, which stores in V[i], the number of bits set in the binary number $2^i$, $0<=i<=2^n-1$.
Counting:
Initialize counter C at 0;
Access the bit vector in chunks of n bits at a time:
for each chunk
store the chunk in i
set C=C+V[i]

For access at the octet level (n=8), the translation table requires no more than 256 octets. For access at the double octet level (n=16), no more than 64 K octets. Larger units of access are not recommended.

Insertion, deletion and reclassification are also efficiently performed, by simply locating the appropriate deep and/or shallow extension and setting/resetting the appropriate bit.

This same representation can be trivially used for storing structures AS2 and AS3. In AS3 the size of the bit vector is equal to the cardinality of the set of concepts in the taxonomy.

As regards compressed bit vectors, by construction, the deep extension is very sparse at terminal level, and very dense at the top levels in the taxonomy. The use of any type of bit vector compression (such as, without prejudice to generality, Run Length Encoding (see Capon J., "A probabilistic model for run-length coding of pictures", IEEE Trans. on Inf. Theory, 1959) and/or variable-length bit vectors) is therefore beneficial in reducing the overall storage overhead, although it introduces a compression/decompression overhead.

If a controlled error-rate in operations is acceptable, Bloom filters (see Bloom, B. H., Space/time tradeoffs in hash coding with allowable errors, Comm. of the ACM, 1970) can be used to represent the deep extension in a compact form, suitable for larger information bases. With Bloom filters, counting and set negation are usually not supported.

For large to very large information bases, a bit vector representation (albeit compressed) may produce an excessive storage overhead. The deep and shallow extensions as well as structure AES3 may be stored as inverted lists (see Wiederhold, G., Files structures, McGraw-Hill, 1987). Because of performance in the computation of set operations, such lists (and the result of set operations) are kept ordered by document id's. For the above-cited statements, it is generally advantageous to use any form of inverted list compression.

As regards the general architectural strategies, the implementation of dynamic taxonomies should try to keep all the relevant data structures in main memory, shared by the processes accessing them.

As noted before, the intension overhead is generally negligible so that intensional structures (with the possible exception of dictionaries) may be usually kept in memory without problems.

Extension overhead for extensional structures is considerably larger. If the storage overhead prevents the complete storage of deep-extension structures, buffering strategies should be used, such as LRU or the ones described in documents Johnson, T., Shasha D.: 2Q: A Low Overhead High Performance Buffer Management Replacement Algorithm, Int. Conf. on Very Large Databases, 1994; and O'Neill, et al.: The LRU-K Page Replacement Algorithm For Database Disk Buffering, SIGMOD Conf. 1993. Shallow extensions and classification structures are less critical and may be kept on disk (again with the buffering strategies described in the two above-mentioned documents).

As indicated in operation AEO3, the membership test without counting can return TRUE when the first DID common to both lists is found, thereby speeding up the computation.

The use and implementation of virtual concepts will now be described.

Some data domains (such as price, dates, quantities, etc.) correspond usually to a concept (e.g. PRICE) which can be expanded into a large number of terminal concepts, each representing a specific value (e.g. 100$). Such a representation causes a high number of son concepts, and increases the complexity of the taxonomy. Alternatively, values can be grouped by defining meaningful intervals of values and representing only the intervals as specific concepts. This representation loses the actual data, and presents the user with a fixed classification. Grouping may also be combined with exhaustive representation, but inherits most of the problems of both schemes.

The invention of "virtual concepts" provides a third, more flexible alternative. We define a "Simple virtual concept" as a concept for which neither the actual sons (actual values of the domain to be represented) nor the actual extension are stored, but are computed (usually from additional, possibly external data).

A virtual concept is completely described by 4 abstract operations:

V1: Given a virtual concept v, retrieve all its sons.
V2: Given a virtual concept v, retrieve its deep extension.
V3: Given the son s of a virtual concept v, retrieve its deep extension.
V4: Given a document d, find all the terminal concepts (descendants of v) under which it is stored.

One way of implementing these abstract operations is by keeping, for each virtual concept v, two abstract relations:

$S_v$: [value]→{DID} which stores the set of documents with a given value in the domain of values of the virtual concept.

$C_v$: [DID]→{value} which stores the set of values for a specific document; if each document has a single value $C_v$: [DID]→[value]. A single $C_v$ relation may store multiple domains and be shared by many virtual concepts: in this case $C_v$: [DID]→{valueA, . . . , valueN}, where valuei denotes the set of values for domain I. It is important to note that neither $S_v$ nor $C_v$ need to be explicitly stored, but they can be also synthesized by queries on external data.

These two abstract relations can be represented by a single relation in a relational schema (without loss of generality and simply to provide a clear description of operations)

$C_v$(DID, value)

with underscored attributes representing the primary keys. $S_v$ actually stores the inversion of $C_v$ and will usually be represented by a secondary index on $C_v$, rather than by a base relation.

With this representation, the abstract operations defined before can be easily implemented by SQL queries:

V1: Given a virtual concept v, retrieve all its sons:
SELECT DISTINCT value
FROM $C_v$ V2: Given a virtual concept v, retrieve its deep extension:
SELECT DISTINCT DID
FROM $C_v$ V3: Given the son s of a virtual concept v, retrieve its extension (s is a terminal concept, so that its deep and shallow extension are the same)
SELECT DISTINCT DID
FROM $C_v$
WHERE value=s Counting is trivially added.

V4: Given a document d, find all the terminal concepts (descendants of v) under which it is stored
RETRIEVE DISTINCT value
FROM $C_v$
WHERE DID=d In general, a virtual concept v can be organized into a sub-taxonomy, i.e. each non-terminal son of v represents a set of actual domain values. Each son may be further specialized, and so on. For instance SALARY can be organized into the following taxonomy:

| SALARY | |
|---|---|
| Low | (e.g. <1000) |
| Medium | (e.g. >=1000 and <10000) |
| High | (e.g. >10000) |

In this case, the non-terminal descendants of v can be stored as derived virtual concepts, i.e. virtual concepts referencing the same abstract relations defined for v, but providing additional restrictions. In the example, "Low" can be characterized by the additional restriction value<1000, so that operation V3 for Low becomes:

SELECT DISTINCT DID
FROM $C_v$
WHERE value<1000

Virtual and derived virtual concepts are peculiar in that their terminal descendants and their extensions are not directly stored but computed. In order to represent them in our framework, the following abstract relations are added to the intension:

AIS5: [CID]→[conceptType]

where conceptType designated real, simple virtual and derived virtual concepts.

AIS6: [CID]→[$S_{CID}$]

for simple virtual concepts, stores the abstrac relation Sv (which can synthesized be a query) for the virtual concept CID

AIS7: [CID]→[$C_{CID}$]

for simple virtual concepts, stores the abstract relation Cv (which can synthesized be a query) for the virtual concept CID AIS8: [CID]→[CID', restriction]

for derived virtual concepts only, identifies the virtual concept to refer to and the additional restriction.

The use and implementation of time-varying concepts will now be described.

Time-varying concepts, such as age, can be represented by a simple variant of virtual concepts. A time instant t is represented as an abstract "timestamp". The timestamp contains the number of clock ticks starting from a fixed time origin; the clock resolution depends on the application. All timestamps use the same time coordinates. The difference between two timestamps t and t' defines the time interval amplitude between the two times. Let the values of the virtual concept v be the set of timestamps of all documents in the extension of v, and let T be the timestamp of the current time, and the sons of v be represented as time intervals with respect to the current timestamp T:

Given a virtual concept v, retrieve all its sons:
   SELECT DISTINCT T-value
   FROM $C_v$
Given a virtual concept v, retrieve its deep extension:
   SELECT DISTINCT DID
   FROM $C_v$
Given the son s of a virtual concept v, retrieve its extension
   SELECT DISTINCT DID
   FROM $C_v$
   WHERE value=T-s Alternatively, and more efficiently, the values of the time-varying concept can be split into N intervals (from more recent to older), which are stored as real concepts. In addition, for each interval I, we keep:

a. the list L(I) of DIDs in the interval ordered by decreasing timestamps (i.e. newer to older)

b. in central memory, an interval representative IR(I): the last DID in the interval together with its timestamp c. a classification criterion (e.g. T-value less than 1 week and no smaller than 1 day)

Since the classification of documents varies with time, we need to re-compute the classification of documents every time tick (arbitrary time interval selected by the system administrator, typically a multiple of clock resolution), according to the following algorithm:

At each time tick:
   For each interval I
      while IR(I) needs reclassification (i.e. it fails the classification criterion for I) do

```
   {
      Reclassify(IR(I));
      set as IR(I) the last DID in the ordered list
   a)
   }
   where Reclassify(IR(I)) is
   Delete IR(I).DID from I
   For(i = i + 1 to N)
   {
      if IR(I).timestamp meets the classification
   criterion for interval i
      {
         insert IR(I) in interval i
         break;
      }
   }
```

Binding a dynamic taxonomy to a database system will now be described.

The present invention allows to use a dynamic taxonomy to browse and retrieve data stored in a conventional dbms (relational, object-relational, object-oriented, etc.). The invention covers data stored as a single relation (or object) or, more generally, represented by a single view on the database (see Elmasri, Navathe, Fundamentals of database systems, The Benjamin/Cummings Publ. Co., 1994).

In this case documents correspond to tuples (or rows, records, objects) in the view V. In order to identify a document we can either use the primary key of the view as a document identifier (DID) or keep two abstract relations mappina system-generated DID's to and from the primary key PK of the view:

DK: [DID]→[PK]
   IDK: [PK]→[DID]

where PK represents the primary key of the relation. DK is used to access a tuple of V, given a document id DID, and IDK is used to retrieve the document id corresponding to a specific value in the primary key of V. This latter representation is beneficial when primary keys PK's are large (e.g. when they are defined on alphanumeric attributes).

Given a view V we can construct a taxonomy T for V in the following way. For each attribute A in V, we place a corresponding concept C(A) (either a real or a virtual one) as an immediate son of the root. Virtual concepts use V itself for the synthesis of sons and extensions (as previously seen). Real concepts can be further specialized as required by the semantics of A.

Given a tuple t in V, for each attribute A in V, let t.A denote the value of attribute A in t. For each real concept C in T (either C(A) or a descendant of C (A)), the designer must provide a boolean clause B(C, t) such that t (represented by DID(t)) is to be classified under C if and only if B(C, t)=TRUE.

The boolean clause B(C, t) may reference any attribute of t, and consequently, new virtual concepts (called "extended concepts") may be defined on combinations of attributes by operations on the database (including but not restricted to sums, averages, etc. of database values).

A special case occurs when the boolean clause B(C, t) is true when $t.A \in S_c$, where $S_c$ is a set of values of attribute A and $S_c \cap S_{c'} = \emptyset$, for $\forall C \neq C'$. In this case, it is more efficient to keep a table T: [v]→[c], listing for each value v in domain (A), the corresponding concept c. If $S_c \cap S_{c'} \neq \emptyset$, for $\exists C \neq C'$, multiple concepts can be associated with the same value, so that T: [v]→{c}.

In addition to this mapping among attributes and concepts, the designer may define new concepts either as taxonomic generalizations of attributes or extended concepts.

New taxonomic generalizations. For virtual concepts, this feature was discussed previously. If the sons of a new taxonomic generalization G are real concepts {S}, no boolean clause is usually required for G, because classification under G is automatically performed by operation AEO9.

Extended concepts. New concepts may be derived either as real or virtual concepts by operations on the database (including but not restricted to sums, averages, etc. of database values).

Binding is then performed in the following way. Virtual concepts do not require any special processing, since they are realized by operations on the database. Real concepts require a classification for any new tuple, a deletion if t is deleted or a reclassification if t is changed. In order to classify t, the system locates the set C of concepts for which B(c, t), $c \in C$ is satisfied and classifies t under $\forall C \in C$ (and, consequently under all of c's ancestors). Deletion and reclassification are performed as previously stated.

EXAMPLE

Given the relation R: (TOWNID, NAME, COUNTRY, POPULATION), we can identify the documents in the database by the values of TOWNID. We need to decide which attributes will be represented in T and how they will be represented. Let COUNTRY be represented by a real concept, and NAME be represented by a virtual concept. In addition we define the real concept CONTINENT as the continent the COUNTRY is in. CONTINENT can be represented in two ways: as a taxonomic generalization concept or as an extended concept.

If we represent CONTINENT as an extended concept, the taxonomy T will be:

NAME
   Sv:Select TOWNID FROM R WHERE NAME=x
   Cv:Select DISTINCT NAME FROM R
CONTINENT
EUROPE t.COUNTRY="Italy" or t.COUNTRY="France" or . . .
AMERICA t.COUNTRY="USA" or . . .
ASIA t.COUNTRY= . . .

| COUNTRY | |
|---|---|
| Italy | t.COUNTRY = "Italy" |
| France | t.COUNTRY = "France" |
| USA | t.COUNTRY = "USA" |
| . . . | |

If we represent CONTINENT as a taxonomic generalization of COUNTRY, the taxonomy T' will be:

NAME
   Sv:Select TOWNID FROM R WHERE NAME=x

| CONTINENT | |
|---|---|
| EUROPE | |
| Italy | t.COUNTRY = "Italy" |
| France | t.COUNTRY = "France" |
| AMERICA | |
| USA | . . . |
| . . . | |
| ASIA | |
| . . . | |
| COUNTRY | |
| Italy | t.COUNTRY = "Italy" |
| France | t.COUNTRY = "France" |
| USA | t.COUNTRY = "USA" |
| . . . | |

In both cases, NAME is represented in the same way. For NAME, we have two abstract relations Sv: [COUNTRY]→{TOWNID}
Cv: [TOWNID]→[COUNTRY]

POPULATION is represented in an analogous way.

Finally, the use of dynamic taxonomies to represent user profiles of interest and implementation of a user alert for new interesting documents based on dynamic taxonomy profiles, will be described.

The invention consists in using set-theoretic expressions on concepts (plus optional, additional expressions, such as information retrieval queries) to describe user interest in specific topics. Such expressions may be directly entered by the user or transparently and automatically captured by the system, by monitoring user query/browsing. The specification of user profiles is especially important in electronic commerce and information brokering and in monitoring dynamic data sources in order to advise users of new or changed relevant information. The information base is assumed to be classified through dynamic taxonomies.

The scenario is as follows. Several users express their interests through possible multiple conceptual expressions, called "interest specifications". A monitoring system accepts these requests (with an abstract user "address" to send alerts to). The monitoring system also monitors an information base for changes (insertion, deletion, change). The information base is described by the same taxonomy used by users to express their interests.

When a change occurs in the information base (the type of change to be alerted for may be specified by users), the system must find the users to alert on the basis of their interests.

A brute force approach will check all user interest specifications exhaustively, and compute whether each changed document d satisfies any given specification S. We can test whether a document d satisfies a specification S by applying the query specified in S to the singleton set $\{d\}$ and test if d is retrieved. However, this strategy requires to perform, for each information base change, as many queries as there are user specifications and may be quite expensive in practice. For this reason, we define alternate strategies which reduce the number of evaluations required.

We are primarily interested into the efficient solution of dynamic taxonomy specifications. Additional expressions, such as information retrieval queries, will usually be composed by AND with taxonomic expressions, and can therefore be solved, if required, after the corresponding taxonomic expression is satisfied.

We will start from the simplest case, in which:
a) the specification is expressed as a conjunction of terminal concepts;
b) documents are classified under terminal concepts only.

As regards conjunctive specifications and document classification under terminal concepts only, we use two abstract storage structures:

1. a directory of specifications, in the form:
   SD: [SID]→[N, SPEC]
where SID is an abstract identifier which uniquely identifies the specification, SPEC is the specification itself (optional), N is the number of concepts referenced in the specification. Optionally, other fields (such as the user "address") will be stored in this structure.

2. a specification "inversion", in the form:
   SI: [CID]→{SID}
listing for each concept c (represented by its concept identifier) all the specifications (represented by their specification id) using that concept.

When a specification is created, its abstract identifier is created, its directory entry is created in SD and the set of concepts referenced in the specification are stored in the inversion SI.

When a document d is inserted, deleted or changed, let C be the set of concepts (terminal concepts by assumption) under which d is classified. The set of specifications that apply to d are then found in the following way.

Let K be the set of concepts used to classify document d. For each concept k in K, let SID(k) be the list of specifications for k (accessible through relation SI) ordered by increasing specification id's. We define MergeCount(K) as the set composed of pairs (SID, N) such that SID is in MergeCount(K) if SID belongs to a SID(k), k in K. If the pair (SID, N) is in MergeCount(K), N counts the number of SID(k) referencing SID. MergeCount(K) can be produced at a linear cost, by merging the SID(k) lists.

Let S be a set initially empty, which represents the set of specifications satisfied by d.
For each pair (SID, N)
   retrieve SID.N from SD;
   if SID.N=N: S=S union SID As regards specifications using unrestricted set operations, let S (represented by SID(S)) be a specification.

Transform S into a disjunctive normal form (i.e. as a disjunction of conjunctions). Let each conjunctive clause in S be called a component of S. We denote by SIDi(S) the i-th component of S.

Store the directory of specifications as two abstract relations:

SD (as before, with N omitted)

SCD: [COMPONENT]→[SDI, N], where COMPONENT stores components of specifications, COMPONENT.SDI represents the specification id of the specification S of which COMPONENT is a component, and COMPONENT.N is the number of concepts referenced in the component.

The specification inversion is stored as: SI: [CID] →{COMPONENT}, where CID is a concept identifier and CID.COMPONENT is the set of components referencing the concept identified by CID.

Let K be the set of concepts used to classify document d, for each concept k in K, let COMPONENT(k) be the list of components for k (accessible through relation SI) ordered by increasing component id's. Define ComponentMergeCount (K) as the set composed of pairs (COMPONENT, N) such that COMPONENT is in ComponentMergeCount(K) if COMPONENT belongs to a COMPONENT(k), k in K. If the pair (COMPONENT, N) is in ComponentMergeCount (K), N counts the number of COMPONENT(k) referencing COMPONENT. ComponentMergeCount(K) can be produced at a linear cost, by merging the COMPONENT(k) lists.

Let S be a set initially empty.

For each pair (COMPONENT, N), retrieve COMPONENT.N through relation SCD;
if COMPONENT.N=N: S=S union COMPONENT.SID (COMPONENT.SID is accessed through relation SCD).

S represents the set of specifications satisfied by d.

As regards specifications and document classification under non-terminal concepts to which they refer, the specification inversion SI needs to be modified in the following way.

If a specification or component Z references concept C, represented by CID(C) then:

C is a terminal concept:
  CID(C).SID=CID(C).SID union Z, if Z is a specification
  CID(C).COMPONENT=CID(C).COMPONENT union
  Z, if Z is a component
C is a non-terminal concept:
  for each k in $C^{down}(C)$
  CID(k).SID=CID(k).SID union Z, if Z is a specification
  CID(k).COMPONENT=CID(k).COMPONENT union
  Z, if Z is a component The set S of satisfied specifications is computed as per the previous cases.

The above-disclosed techniques allow computing the specifications satisfied by a document d. In case it is desired to determine the specifications satisfied by a set of documents D (whose cardinality is greater than 1), the above-disclosed techniques can be applied in two ways. In the first way, the techniques are applied without modifications to every document d in D, then removing possible duplicate specifications. In the second way, K is defined as the set of concepts used to classify D, the adequate technique is chosen among the described ones and the set S of "candidate" specifications is determined. Every specification s in S is then checked, performing it on D.

What is claimed is:

1. A process for retrieving information on large heterogeneous databases, wherein information retrieval is performed through visual queries on dynamic taxonomies, said dynamic taxonomies being an organization of concepts that ranges from a most general concept to a most specific concept, said concepts and their generalization or specialization relationships being an intension, documents in said databases being able to be classified under different concepts, said documents and their classification being called an extension, said process comprising:

initially displaying a complete taxonomy for said retrieval;

selecting subsets of interest of said complete taxonomy in order to refine said retrieval, said subsets of interest being specified by selecting taxonomy concepts and combining them through boolean operations or being specified through querying methods, which retrieve classified documents according to different selection criteria, including words contained in a document;

displaying a reduced taxonomy for said selected set, said reduced taxonomy being derived from the original taxonomy by pruning the concepts under which no document in the selected subset of interest is classified; and iteratively repeating said steps of selecting subsets and of displaying a reduced taxonomy to further refine said retrieval, wherein:
said process is performed on documents of any type and format;
said intension is organized as a hierarchy of concepts or as a directed acyclic graph of concepts, thereby allowing a concept to have multiple fathers;
said process dynamically reconstructs all relationships among concepts based on the classification without requiring, in the intension, concept relationships in addition to generalization or specialization, a relationship between any two concepts existing if and only if at least one document is classified (1) under a first concept or any descendants of the first concept, and (2) under a second concept, or any descendants of the second concept;
documents in said classification are classified under a concept at any level in said intension, including concepts with no sons;
said taxonomy supports operations for concept insertion, deletion, and modification;
said taxonomy supports operations for document insertion and classification, deletion, and reclassification;
documents in said classification are classified manually, programmatically, or automatically;
said process allows retrieval through different languages on a same database, while maintaining the same classification for all said languages;
said classification is explicitly stored as a set or list of documents for each concept or implicitly stored in external structures;
said explicitly stored classification includes, for each concept in the intension, deep classification, which records all documents classified under the concept and under any of its descendants, and a shallow classification, which records all the documents classified directly under the concepts, said shallow classification being only required if documents can be classified under non-terminal concepts and is equivalent, by definition, to the deep classification for terminal concepts;

said deep and shallow classifications are physically stored as compressed or uncompressed bit vectors, or as compressed or uncompressed inverted lists, or as Bloom's filters, or in a relational database system;

said process accounts for an age of documents either explicitly or implicitly, or by a lazy reclassification of a minimum number of concepts;

said intension and classification are used either for querying/browsing the database or to dynamically inform a user when documents of interest are added or modified in the database; and said step of displaying a reduced taxonomy either reports only the concepts belonging to the reduced taxonomy or, for each such concept, also reports how many documents in the interest set are classified under the concept.

2. The process according to claim 1, wherein each document d is identified by a unique identifier (DID (d)), and each concept c is identified by a unique identifier (CID (c)), and a conceptual schema for the intension comprises:

a dictionary relation for each language supported, which binds each concept identifier to a label describing that concept, which will be presented to the user when the taxonomy is displayed;

a father-to-son relation which lists, for each concept, all sons of the concept, said list being configurable as to be ordered; and a son-to-father relation which lists, for each concept, all fathers of the concept; and a conceptual schema for the extension comprises, for each concept:

a deep classification that lists all documents classified under the concept or any descendants of the concept;

a shallow classification, which lists all documents directly classified under the concept; and a classification relation which lists, for each document, all concepts under which the document is directly classified, ancestors of said concepts being recoverable through the son-to-father relation in the intension.

3. The process according to claim 1, wherein boolean operations on concepts are implemented through corresponding set operations on the deep classification of said concepts.

4. The process according to claim 1, wherein said step of displaying a reduced taxonomy for the set selected in said selecting step comprises a testing operation such that a concept is displayed in the reduced taxonomy if an intersection between the set and the deep classification of the concept is not empty, the testing operation being configured to optionally count a number of documents in said intersection to show a user a number of documents in the set that are also classified under the concept, said testing operation being also configured to be applied to the shallow classification, if used, to show the user a number of documents in the set that are also directly classified under the concept, the numbers being useful when documents can be classified at any level of abstraction in the taxonomy, said testing operation being also configured to be applied to a set including a single document d, in order to compute a classification of d, if not explicitly stored, said testing operation being used to produce a reduced tree by testing and displaying the sons of a root and, on subsequent explosion of a concept c, testing and displaying the sons of concept c.

5. The process according to claim 1, wherein said taxonomy supports modification operations on the intension, such operations supporting:

an insertion of a new concept, performed by inserting the new concept in the dictionaries, in the father-to-son relation, and in the son-to-father relation;

a deletion of an existing concept C, performed by:

deleting from the intension all concepts in $C^{down}(C)$, wherein $C^{down}(C)$ denotes a set of all descendants of the concept C, in union with the concept C;

adding documents in the deep classification of the concept C to the shallow classification of a set of the fathers of the concept C in the taxonomy;

removing the shallow and deep classifications for all concepts in $C^{down}(C)$;

removing the concepts in $C^{down}(C)$ from a classification of all documents in the deep classification of the concept C;

changing a labeling of a concept, said changing step only requiring a modification of an appropriate dictionary;

changing a place of a concept in the taxonomy; and adding an additional father to a concept in the taxonomy.

6. The process according to claim 1, wherein said taxonomy supports modification operations on the classification, such operations supporting:

an insertion of a new document d, said insertion comprising the steps of: for each $c \in \{C\}$, wherein C denotes a set of concepts under which d must be classified, inserting DID(d) in the shallow classification of c, if c is not a terminal concept and the shallow classification must be stored; inserting DID(d) in the deep classification of $C^{up}(c)$, $C^{up}(c)$ denoting a set of all ancestors of the concept c in union with c; and inserting c in a classification of d;

a deletion of an existing document d, said deletion comprising the steps of: retrieving a set of concepts $\{C\}$ under which d is shallowly classified; for each $c \in \{C\}$, deleting DID(d) from the shallow classification of c; for each ancestor of c, c included, deleting DID(d) from the deep classification of each ancestor; deleting an entry corresponding to DID(d) from the classification relation;

a reclassification of an existing document d, according to a different concept, said reclassification comprising the steps of: letting d be initially classified under a concept c, possibly null, c' being a new concept under which d must be classified, possibly null; if both c and c' are non-null, classifying d under c'; if c is null, additionally classifying d under c'; if c' is null, removing the original classification under c; if c is not null, eliminating DID(d) from the shallow classification of c; eliminating DID(d) from the deep classification of all ancestors c" of c, c included; eliminating c from the classification of d; if c' is not null, inserting DID(d) in the shallow classification of c', if the shallow classification of c exists; inserting DID(d) in the deep classification of all ancestors c" of c, c included; inserting c' in the classification of d.

7. The process according to claim 1, wherein said deep and shallow classifications are physically stored as uncompressed or compressed bit vectors, and a counting of documents in a result of logic operations on bit vectors is performed through a constant table V whose size is $2^n$, whose element V[i] contains a number of bits at 1 in binary number i, and processing the uncompressed form of the bit vector n bits at a time, adding to a counter for every group j of n bits, whose binary value is v', an amount V[v'].

8. The process according to claim 1, wherein said classification is implicitly stored as virtual concepts in external structures, said virtual concepts being concepts for which neither actual sons, that are actual values of a domain to be represented, nor an actual classification are stored, but instead are computed, said virtual concept being able to be a simple virtual concept, which is completely described by four abstract operations:

V1: given a virtual concept v, retrieve all its sons;

V2: given a virtual concept v, retrieve its deep classification;

V3: given the son s of a virtual concept v, retrieve its deep classification; and V4: given a document d, find all the terminal concepts, descendants of v, under which it is classified;

said abstract operations being implemented based on two abstract relations, for each virtual concept v: a relation $S_v$ which stores a set of documents for each value in a domain of values of the virtual concept; and its inversion $C_v$, optionally stored, which stores a set of values for each document classified under said virtual concept;

said virtual concept being configured to be a derived virtual concept, which refers to said two abstract relations, with additional restrictions;

additional information being kept in the intension, for each concept, to describe its type; for each simple virtual concept to address said S, and said optional $C_v$ relation; for each derived virtual concept to address said two abstract relations and a restriction to apply to its base relations ($S_v$ and $C_v$).

9. The process according to claim 8, wherein said process accounts for an age of documents implicitly by means of virtual concepts, or by a lazy reclassification of a minimum number of concepts, a representation of time-varying concepts by virtual concepts being characterized in that the time-varying concepts, whose value is represented by abstract timestamps, can be represented by a virtual concept, representing with T the timestamp value of the current time, sons of said time-varying concept V being retrieved through an abstract query that selects all unique T-values in $C_v$ where T is a current time, the deep classification of said time-varying concept V being retrieved through an abstract query that selects all unique DIDs from $C_v$, the classification of a son s of said time-varying concept V being retrieved through an abstract query that selects all unique DIDs in $C_v$ with value=T-s, where T is the current time, in the lazy evaluation of time-varying concepts, the time-varying concepts being split into N intervals, from more recent to older, which are stored as real concepts, for each interval I, the following being kept:

(a) a list L(I) of DIDs in an interval ordered by decreasing timestamps, (b) an interval representative of IR(I), a last DID in the interval together with its timestamp, (c) a classification criterion for the interval, the classification of documents being periodically recomputed, for each interval I, by reclassifying IR(I) if IR(I) needs reclassification and setting IR(I) as the last DID in the ordered list (a), and deleting IR(I).DID from I, while iteratively inserting IR(I) in interval i+1 to N if IR(I) meets a classification criterion for interval i.

10. The process according to claim 1, wherein said dynamic taxonomy is used to represent data represented by a single view on an external database, the documents corresponding to tuples, rows, records, or objects, in a view V, and, in order to identify a document, a candidate key of the view being used as document identifier (DID) or two abstract relations being kept for mapping system-generated DIDs to and from a primary key PK of the view, a taxonomy T for V being able to be constructed by inserting concepts of interest for V in the taxonomy, each concept C being associated to a boolean clause B(C, t), where t denotes a tuple, said boolean clause being able to reference any attribute of t and returning true if and only if t must be classified under C, said concept C being a real concept or a virtual concept, said virtual concept using V itself for a synthesis of sons and extensions, wherein if said real concept represents an attribute A of V such that said boolean clause is true when $t.A \in S_c$, where $S_c$ is a subset of the domain of attribute A, the boolean clause is replaced, for a better performance, by a table listing, for each value v in domain(A), corresponding concepts under which t is to be classified, in order to create new taxonomic generalizations, if the sons of a new taxonomic generalization G are real concepts, no boolean clause for G being needed, a classification under G being automatically performed by an insertion operation for a new document, a binding for real concepts requiring an insertion for any new tuple, a deletion if t is deleted or a reclassification if t is changed, said process, in order to classify t, locating a set C of concepts for which B(c, t), $c \in C$ is satisfied and classifying t under $\forall c \in C$, and binding for virtual concepts is realized by operations of V itself.

11. The process according to claim 1, wherein dynamic taxonomies are used in order to represent user profiles of interest to alert users for new interesting documents based on dynamic taxonomy profiles, said process further comprising the steps of:

acquiring multiple conceptual expressions from a user, said conceptual expressions defining subjects in which the user is interested;

accepting said conceptual expressions by a monitoring system;

coupling, by said monitoring system, an abstract user address, to which alerts are to be sent, to said conceptual expressions;

monitoring, by said monitoring system, an information base for changes performed thereto, said information base being described by the same taxonomy used by users to express their interests;

when a change occurs in the information base, finding, by said monitoring system, the users to be alerted based on their interests;

dynamic taxonomy concepts being used to realize said monitoring step, for said dynamic taxonomy concepts additional expressions, being composed by AND with taxonomic expressions, and being solved, if required, after a corresponding taxonomic expression is satisfied, a checking step whether a document d satisfies a user specification S being performed by applying a query specified in S to a set {d} and checking whether d is retrieved, if specifications only comprise conjunction operations and document classification is only under terminal concepts, two abstract storage structures being used:

a directory of specifications (SD) relating SID and N, SPEC, where SID is an abstract identifier which uniquely identifies the specification, SPEC is the specification itself, N is a number of concepts referenced in the specification;

a specification inversion (SI), relating CID and SID, listing for each concept, represented by its concept identifier, all specifications represented by their specification ID using that concept wherein, when a specification is created, its abstract identifier is created, its directory entry being created in SD and a set of concepts referenced in the specification being stored in an inversion SI, while, when a document d is changed, C being a set of concepts under which d is classified, a set of specifications that apply to d being found as follows: K being a set of concepts used to classify document d, for each concept k in K, SID(k) is a list of specifications for k, accessible through relation SI, ordered by increasing specification ID's; defining MergeCount(K) as a set composed of pairs (SID, N) such that SID is in MergeCount (K) if SID belongs to a SID (k), k in K; if a pair (SID, N) is in MergeCount(K), N counts a number of SID(k) referencing SID; if S is an initially empty set, which represents a set of specifications satisfied by d, for each pair (SID, N), retrieving SID.N from SD; if SID.N=N: S=S union SID, when there are specifications using unrestricted set operations, S, represented by SID(S), being a specification and the following steps being used:

transforming S in disjunctive normal form as a disjunction of conjunctions, each conjunctive clause in S being called a component of S, SIDi(S) denoting the i-th component of S;

storing a directory of specifications as two abstract relations: SD, omitting N, and SCD, relating COMPONENT and SDI, N, where COMPONENT stores components of specifications, COMPONENT.SDI represents a specification ID of specification S of which COMPONENT is a component, and COMPONENT.N is a number of concepts referenced in the component;

storing a specification inversion as relation (SI) between CID and CID.COMPONENT, where CID is a concept identifier and CID.COMPONENT is a set of components referencing the concept identified by CID;

with K being the set of concepts used to classify document d, for each concept k in K, COMPONENT (k) is a list of components for k, accessible through relation SI, ordered by increasing component ID's;

defining ComponentMergeCount(K) as a set composed of pairs (COMPONENT, N) such that COMPONENT is in ComponentMergeCount(K) if COMPONENT belongs to a COMPONENT(k), k in K;

if a pair (COMPONENT, N) is in ComponentMergeCount(K), N counting the number of COMPONENT(k) referencing COMPONENT;

with S being a set initially empty, for each pair (COMPONENT, N), retrieving COMPONENT.N through relation SCD;

if COMPONENT.N=N: S=S union COMPONENT.SID, S representing a set of specifications satisfied by d; the modification of a specification inversion SI comprising the steps of:

if a specification or component Z references concept C, represented by CID(C) then:
  if C is a terminal concept:
    CID(C).SID=CID(C).SID union Z, if Z is a specification,
    CID(C).COMPONENT=CID(C).COMPONENT union Z, if Z is a component
  if C is a non-terminal concept, for each k in $C^{down}(C)$:
    CID(k).SID=CID (k).SID union Z, if Z is a specification,
    CID(k).COMPONENT=CID(k).COMPONENT union Z, if Z is a component, the specifications satisfied by a set of documents D whose cardinality is greater than 1 being computed by applying previous techniques without modifications to every document d in D, then removing possible duplicate specifications; or being computed by: defining as K a set of concepts used to classify D; applying an adequate technique among the described ones; and determining a set S of candidate specifications, every specification s in S being then checked by performing it on D.

12. The process according to claim 1, wherein the reduced taxonomy is totally computed in a single step, wherein RT is a set of concepts in the reduced taxonomy, RT being computed by applying said testing operation, for each concept C in the intension, and further in that said operation is speeded up through the steps of:

initializing a table S of size T, where T is a number of concepts in the intension and S[i] holds information on a current status of concept i, initialized at pending;

starting from uppermost levels, and continuing down in a tree, processing concept i;

if S[i] is empty, determining that i does not belong to RT, and continuing the processing with a next concept;

if S[i] is not empty, applying said testing operation to i; if said testing operation produces a non-empty intersection, determining that i belongs to RT; otherwise, determining that neither i nor any of its descendants belong to RT and setting to empty all S[j] in S, such that j is a descendant of i in the taxonomy, the descendants of I being either computed from the intension or being precomputed and stored in a table D, holding for each concept in the taxonomy a list of all concepts descending from it in the taxonomy, such a table being recomputed every time the intension changes.

* * * * *

UNITED STATES PATENT AND TRADEMARK OFFICE
CERTIFICATE OF CORRECTION

PATENT NO. : 6,763,349 B1
DATED : July 13, 2004
INVENTOR(S) : Giovanni Sacco

It is certified that error appears in the above-identified patent and that said Letters Patent is hereby corrected as shown below:

<u>Column 1,</u>
Following line 31, insert -- SUMMARY OF THE INVENTION
The present Applicants developed for such purpose a process solving the above problems by an innovative use of taxonomies as a structuring and information access tool. --
Lines 36-51, delete the entire paragraph.
Line 52, delete "As disclosed in Hearst,"
Line 52, change "a" to -- A --.

Signed and Sealed this

Sixteenth Day of November, 2004

JON W. DUDAS
*Director of the United States Patent and Trademark Office*